United States Patent
Shimizu et al.

(10) Patent No.: US 12,255,427 B2
(45) Date of Patent: Mar. 18, 2025

(54) TERMINAL CONNECTION WITHIN AN ELECTRICAL JUNCTION BOX

(71) Applicant: Yazaki Corporation, Tokyo (JP)

(72) Inventors: Isanori Shimizu, Makinohara (JP); Arata Yagi, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 359 days.

(21) Appl. No.: 17/866,869

(22) Filed: Jul. 18, 2022

(65) Prior Publication Data

US 2023/0018379 A1 Jan. 19, 2023

(30) Foreign Application Priority Data

Jul. 19, 2021 (JP) ................................. 2021-118830

(51) Int. Cl.
| | | |
|---|---|---|
| *H01R 13/10* | (2006.01) | |
| *H01R 13/20* | (2006.01) | |
| *H01R 13/627* | (2006.01) | |
| *H01R 31/06* | (2006.01) | |

(52) U.S. Cl.
CPC ............ *H01R 31/06* (2013.01); *H01R 13/10* (2013.01); *H01R 13/20* (2013.01); *H01R 13/6273* (2013.01)

(58) Field of Classification Search
CPC .... H01R 13/10; H01R 13/20; H01R 13/6273; B60R 16/0238; B60R 16/0239
See application file for complete search history.

(56) References Cited

U.S. PATENT DOCUMENTS

| | | | | |
|---|---|---|---|---|
| 2,962,693 | A | * 11/1960 | Ott | .......................... H01R 39/36 |
| | | | | 439/849 |
| 7,372,415 | B2 | * 5/2008 | Chun | ................... H01R 13/115 |
| | | | | 343/906 |
| 2007/0049132 | A1 | 3/2007 | Uchida et al. | |
| 2012/0208395 | A1 | 8/2012 | Fujiwara | |
| 2018/0076586 | A1 | 3/2018 | Rangi et al. | |
| 2024/0196522 | A1* | 6/2024 | Nukui | .................. H05K 1/0254 |

FOREIGN PATENT DOCUMENTS

| | | |
|---|---|---|
| JP | 1-177878 U | 12/1989 |
| JP | 2000-295738 A | 10/2000 |
| JP | 2007-95661 A | 4/2007 |
| JP | 2012-169220 A | 9/2012 |

* cited by examiner

*Primary Examiner* — Vanessa Girardi
(74) *Attorney, Agent, or Firm* — Sughrue Mion, PLLC

(57) ABSTRACT

An electrical junction box includes: a first housing configured to hold a first terminal having a flat plate shape; a second terminal configured to allow the first terminal to be inserted thereinto such that the second terminal is conductively connected to the first terminal when the first terminal is inserted into the second terminal; and a second housing configured to be engaged with the first housing. The first housing has a first space defining, together with a second space of the second housing, a space configured to accommodate the second terminal. The first space is configured to accommodate a part of the first terminal. When the first housing is engaged with the second housing, the first terminal is allowed to be inserted into the second terminal such that the first terminal and the second terminal are conductively connected.

2 Claims, 6 Drawing Sheets

TERMINAL CONNECTION WITHIN AN ELECTRICAL JUNCTION BOX

CROSS-REFERENCE TO RELATED APPLICATIONS

This application is based on and claims priority under 35 USC 119 from Japanese Patent Application No. 2021-118830 filed on Jul. 19, 2021, the contents of which are incorporated herein by reference.

TECHNICAL FIELD

The present disclosure relates to an electrical junction box.

BACKGROUND ART

In the related art, there is proposed an electrical junction box that is connected to a control circuit, mounted on a vehicle, and connected to a motor or the like of the vehicle. As an example of a method for connecting the control circuit and the electrical junction box, JP-A-2007-095661 discloses a conductive connection between terminals by a tab-shaped terminal and a box-shaped terminal. Specifically, a terminal of one of the control circuit and the electrical junction box has a tab-shaped portion, and a terminal of the other of the control circuit and the electrical junction box has a tubular portion. The tab-shaped portion of the one terminal is inserted into the tubular portion of the other terminal to achieve the conduction connection in a tubular hole. The one terminal is crimped by a crimping piece of the other terminal at a different position, thereby fixing the one terminal to the other terminal.

SUMMARY OF INVENTION

In JP-A-2007-095661, when the terminals are to be accommodated in a housing, it is difficult to accommodate (hold) the terminals by insert molding, press fitting, or the like, since the terminals are integrated. For this reason, it is necessary to select a method different from insert molding or press fitting to accommodate the integrated terminals in the housing. In such a case, a dedicated process is required to accommodate the terminals in the housing, making the operation complicated.

Even when the other terminal is joined (e.g., by rivet joining) to the one terminal after the one terminal is accommodated in the housing, a dedicated process is usually separately performed to join the terminals. In this way, there is room for improvement in the electrical junction box in the related art from the viewpoint of workability.

The present disclosure has been made in view of the above circumstances, and an object thereof is to provide an electrical junction box excellent in workability.

The present disclosure provides an electrical junction box includes: a first housing configured to hold a first terminal having a flat plate shape; a second terminal configured to allow the first terminal to be inserted thereinto such that the second terminal is conductively connected to the first terminal when the first terminal is inserted into the second terminal; and a second housing configured to be engaged with the first housing. The first housing has a first space defining, together with a second space of the second housing, a space configured to accommodate the second terminal. The first space is configured to accommodate a part of the first terminal. When the first housing is engaged with the second housing, the first terminal is allowed to be inserted into the second terminal such that the first terminal and the second terminal are conductively connected.

According to the present disclosure, it is possible to provide an electrical junction box excellent in workability.

The present disclosure is briefly described above. Details of the present disclosure will be further clarified by reading the detailed description described below with reference to the accompanying drawings.

DESCRIPTION OF EMBODIMENTS

First Embodiment

Figure 1:
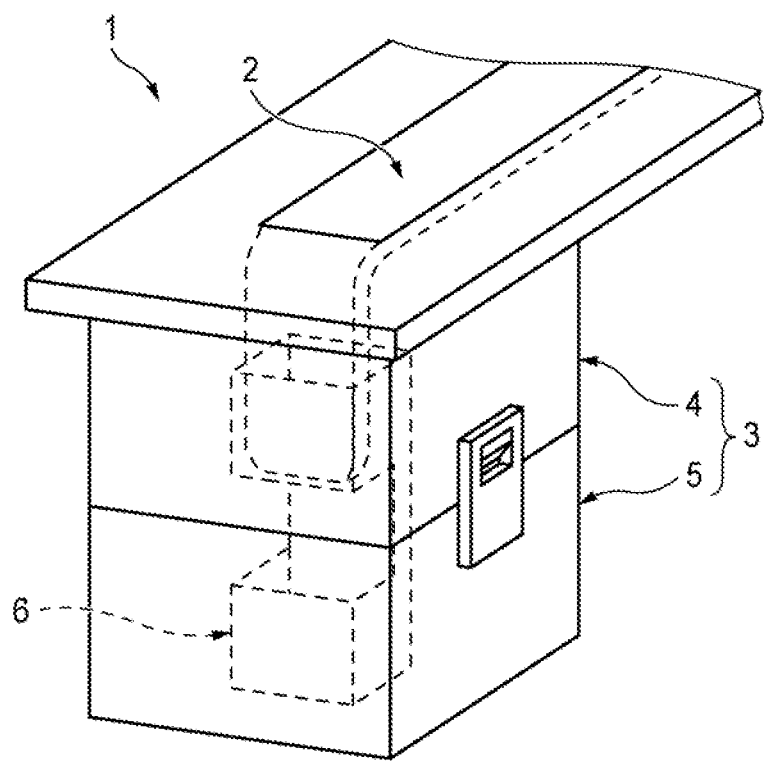
FIG. 1 is a perspective view illustrating an electrical junction box according to a first embodiment of the present disclosure.
Figure 1:
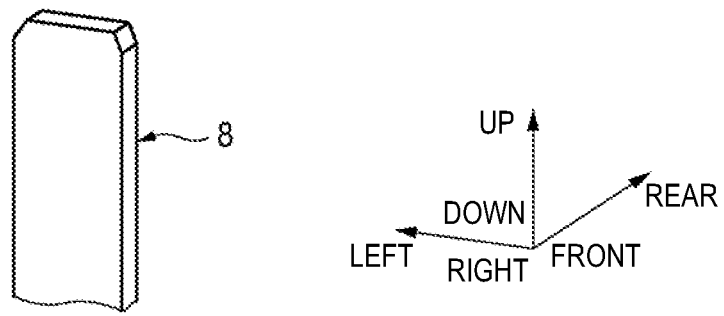

Hereinafter, an electrical junction box 1 according to the first embodiment of the present disclosure will be described with reference to the drawings. The electrical junction box 1 is mounted on a vehicle and is also an electrical control box that conductively connects a control circuit (not illustrated) and a motor (not illustrated). That is, one end of the electrical junction box 1 is conductively connected to the control circuit, and the other end of the electrical junction box 1 is conductively connected to a motor terminal 8 (motor).

Hereinafter, as illustrated in FIGS. 1 to 6, "front-rear direction", "up-down direction", "left-right direction", "front", "rear", "up", "down", "right", and "left" are defined for convenience of description. The "front-rear direction", the "up-down direction", and the "left-right direction" are orthogonal to one another. The up-down direction corresponds to the insertion direction and the engagement direction of the present disclosure. The insertion direction is a direction in which a male terminal 2 is inserted into a female terminal 6, and the engagement direction is a direction in which a first housing 4 is engaged (that is, assembled) with a second housing 5. The left-right direction corresponds to "direction that intersects the insertion direction" of the present disclosure.

As illustrated in FIG. 1, the electrical junction box 1 includes the first housing 4 that holds the flat plate-shaped male terminal 2, the female terminal 6 into which the male terminal 2 is inserted and conductively connected, and the second housing 5 that is engaged with the first housing 4. In other words, the first housing 4 that holds the male terminal 2, the female terminal 6, and the second housing 5 constitute the electrical junction box 1. The male terminal 2 corresponds to "first terminal" of the present disclosure, and the female terminal 6 corresponds to "second terminal" of the present disclosure. Hereinafter, the first housing 4 (including the male terminal 2), the second housing 5, and the female terminal 6 that constitute the electrical junction box 1 will be described in order.

Figure 2:
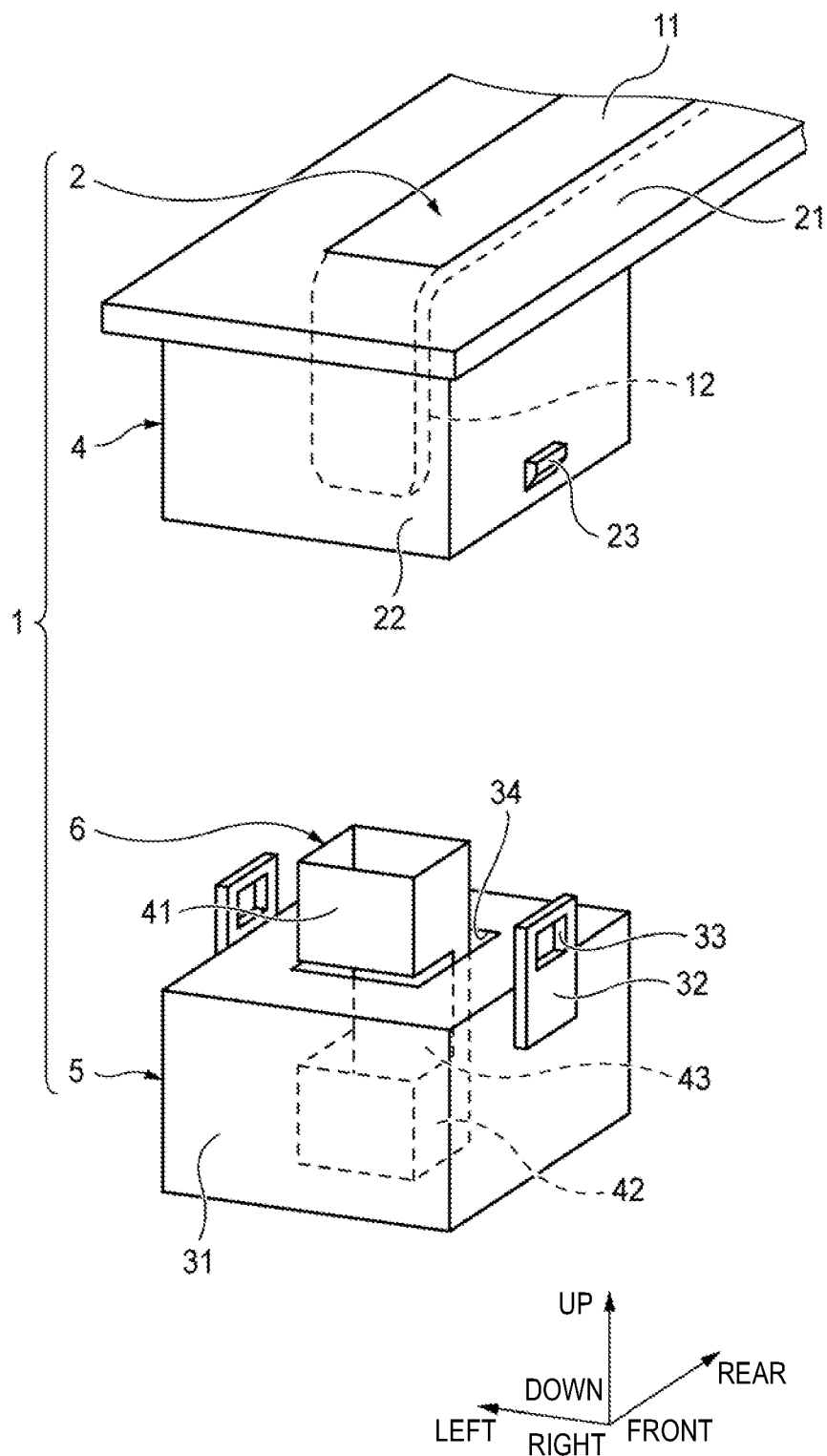
FIG. 2 is an exploded perspective view of a main part of the electrical junction box illustrated in FIG. 1.
Figure 3:
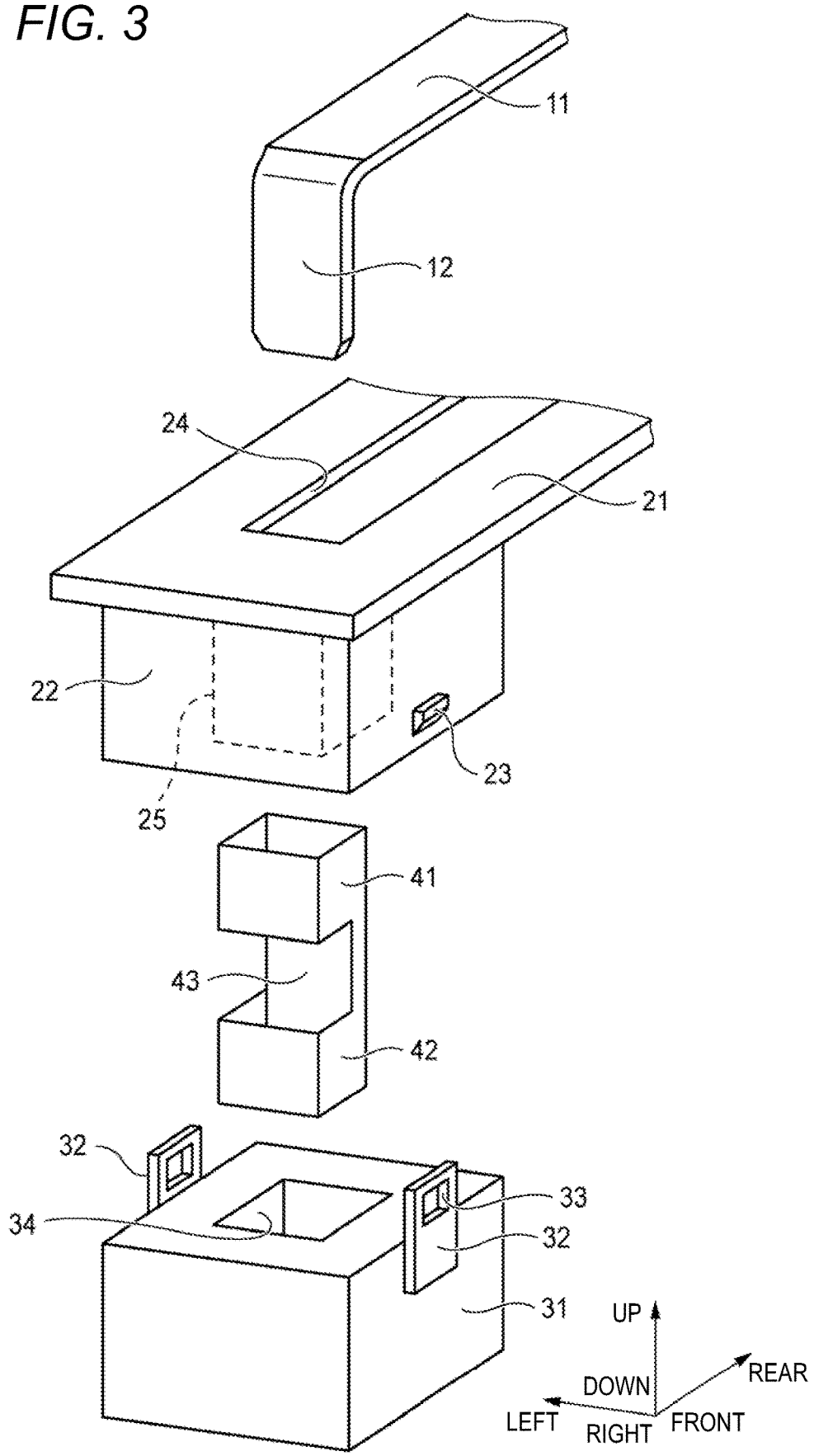
FIG. 3 is an exploded perspective view of the electrical junction box illustrated in FIG. 2.
Figure 4A:
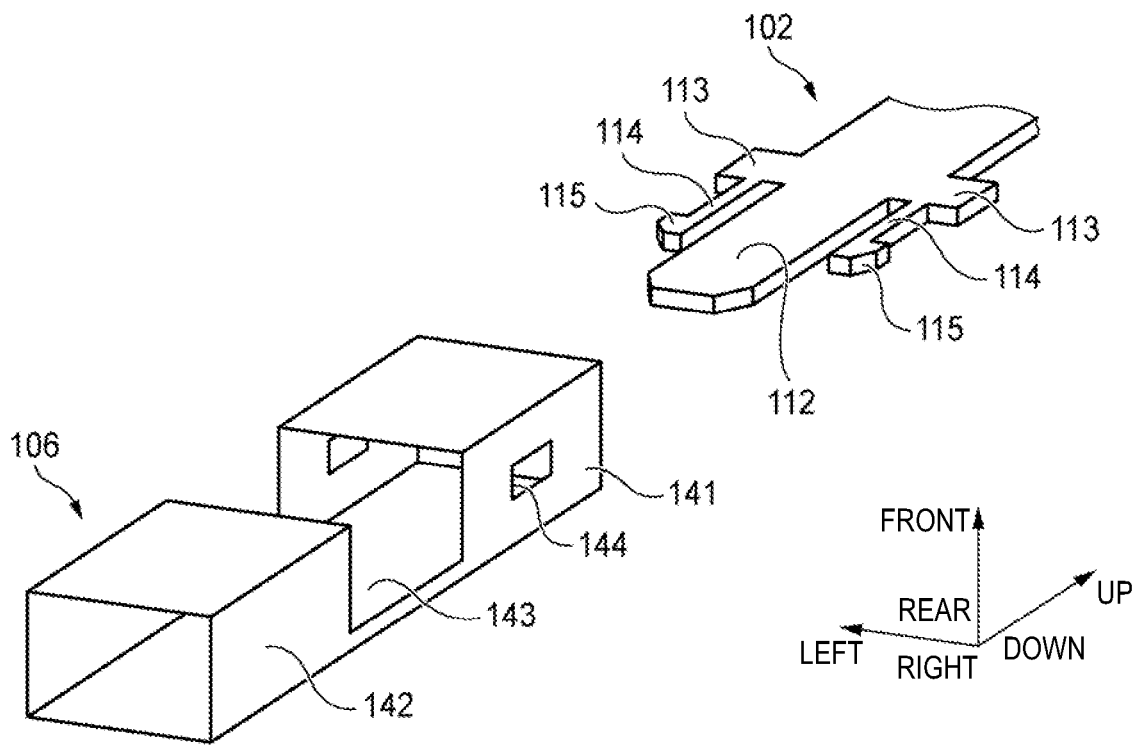
FIG. 4A is a perspective view illustrating a connection state of a male terminal and a female terminal of an electrical junction box according to a second embodiment of the present disclosure before the male terminal is inserted into the female terminal.
Figure 4B:
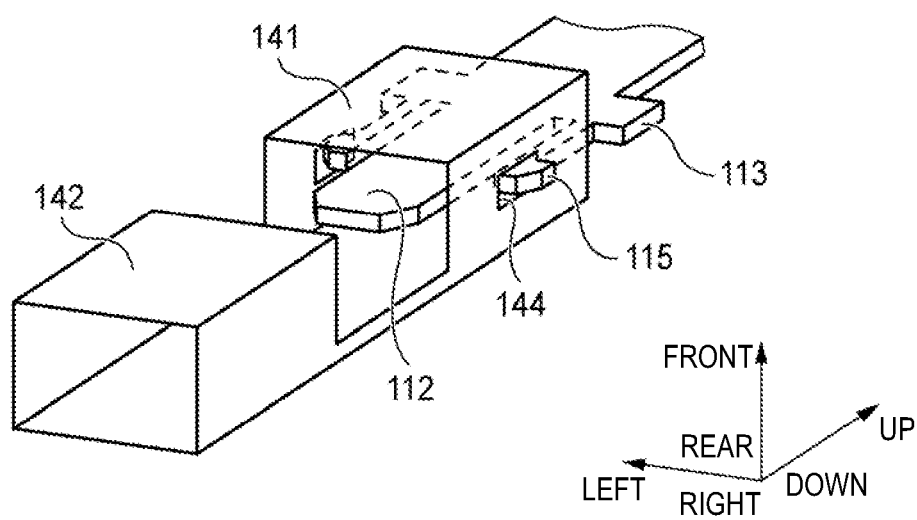
FIG. 4B is a perspective view illustrating a connection state of the male terminal and the female terminal after the male terminal is inserted into the female terminal, where a conductive portion and a lance are omitted in FIGS. 4A and 4B.

First, the first housing 4 will be described. As illustrated in FIG. 1, the first housing 4 is engaged with the second housing 5 to constitute a housing 3 that accommodates (holds) the female terminal 6 together with the second housing 5. As illustrated in FIGS. 1 to 3 (particularly, FIG. 3), the first housing 4 integrally includes a main body 22 having a substantially rectangular tubular shape extending in the up-down direction, and an upper wall portion 21 located on an upper surface of the main body 22 and constituting most of an external appearance of an upper surface of the electrical junction box 1.

The main body 22 is integrally provided with a locking projection 23 on an outer surface of each of a pair of peripheral walls that face each other. The locking projection 23 is provided on each of the right peripheral wall and the left peripheral wall, and protrudes to the right on the right peripheral wall and protrudes to the left on the left peripheral wall. The locking projection 23 has a function of preventing the first housing 4 and the second housing 5 from being separated from each other in the up-down direction by being locked to a locking hole 33 of the second housing 5 to be described later.

The main body 22 has a first space 25 provided inside the main body 22 surrounded by peripheral walls of the main body 22 and penetrating the main body 22 in the up-down direction. In other words, the first space 25 is a tubular hole of the main body 22 having a substantially rectangular tubular shape. The first space 25 accommodates a first tubular portion 41 of the female terminal 6 to be described later (particularly, see FIG. 1).

The upper wall portion 21 is provided with a holding portion 24 that holds the male terminal 2. The holding portion 24 is obtained by opening a part of the upper wall portion 21 corresponding to the shape of a held portion 11 of the male terminal 2 to be described later. Specifically, the holding portion 24 is an opening extending in the front-rear direction and penetrating the upper wall portion 21 in the up-down direction. That is, the held portion 11 of the male terminal 2 is press-fitted into the holding portion 24. For example, when the male terminal 2 is insert-molded to the upper wall portion 21, the holding portion 24 may have a groove shape recessed downward from an upper surface of the upper wall portion 21. In this way, the male terminal 2 is integrally provided (that is, integrally molded) in the first housing 4.

Next, the male terminal 2 will be described. The male terminal 2 is implemented by a flat plate-shaped bus bar. One end of the male terminal 2 is conductively connected to the female terminal 6 (and the motor terminal 8), and the other end of the male terminal 2 is conductively connected to the control circuit (not illustrated). As illustrated in FIGS. 1 to 3, the male terminal 2 includes the held portion 11 extending in the front-rear direction and a connection portion 12 obtained by bending a front end of the held portion 11 downward.

The male terminal 2 is integrally molded with the first housing 4 such that the held portion 11 is held by the holding portion 24 of the first housing 4. The connection portion 12 is accommodated in the first space 25. When the first housing 4 and the second housing 5 are assembled, the connection portion 12 is inserted into the first tubular portion 41 of the female terminal 6 to be described later. The male terminal 2 then comes into contact with a conductive portion (not illustrated) in a tubular hole of the first tubular portion 41, so that the male terminal 2 and the female terminal 6 are conductively connected.

Next, the second housing 5 will be described. As illustrated in FIG. 1, the second housing 5 is engaged with the first housing 4 to constitute, together with the first housing 4, the housing 3 that accommodates (holds) the female terminal 6. As illustrated in FIGS. 1 to 3 (particularly, FIG. 3), the second housing 5 includes a substantially rectangular parallelepiped main body 31.

The main body 31 is integrally provided with a locked portion 32 on an outer surface of each of a pair of wall portions facing each other in the left-right direction. The locked portion 32 is provided on each of the right wall portion and the left wall portion, and extends upward from the wall portions. An upper end surface of the locked portion 32 is located above the main body 31.

The locked portion 32 is provided with the locking hole 33 penetrating the locked portion 32 in the left-right direction at a position above the upper surface of the main body 31. That is, the locked portion 32 is provided in a position corresponding to the locking projection 23 of the first housing 4. The locking projection 23 of the first housing 4 has a function of preventing the first housing 4 and the second housing 5 from being separated from each other in the up-down direction by being locked in the locking hole 33.

The main body 31 has a second space 34 recessed from the upper surface toward a lower surface of the main body 31. The second space 34 is a recessed space defined by wall portions of the main body 31. The second space 34 accommodates a second tubular portion 42 and an intermediate portion 43 of the female terminal 6 to be described later (particularly, see FIG. 1). When the first housing 4 and the second housing 5 are engaged, the second space 34 defines, together with the first space 25 of the first housing 4, an accommodation space in which the female terminal 6 is accommodated.

The motor terminal 8 is inserted into the female terminal 6 as to be described later. For this reason, an insertion hole (not illustrated) through which the motor terminal 8 is inserted is provided in the lower surface of the main body 31. The insertion hole communicates with the second space 34.

Next, the female terminal 6 will be described. The female terminal 6 is made of a conductive material and is thinner than the male terminal 2. As illustrated in FIGS. 1 to 3, the female terminal 6 includes the first tubular portion 41 into which the male terminal 2 is inserted, the second tubular portion 42 into which the motor terminal 8 is inserted, and the intermediate portion 43 located between the first tubular portion 41 and the second tubular portion 42.

In particular, as illustrated in FIG. 3, the first tubular portion 41 has a substantially rectangular tubular shape provided with a tubular hole penetrating the first tubular portion 41 in the up-down direction. The conductive portion (not illustrated) is provided in the tubular hole of the first tubular portion 41. When the connection portion 12 of the male terminal 2 is inserted into the first tubular portion 41, the connection portion 12 comes into contact with the conductive portion in a predetermined position, so that the male terminal 2 and the female terminal 6 are conductively connected.

Similarly, the second tubular portion 42 has a substantially rectangular tubular shape provided with a tubular hole penetrating the second tubular portion 42 in the up-down direction. A conductive portion (not illustrated) is provided in the tubular hole of the second tubular portion 42. When the motor terminal 8 is inserted into the second tubular portion 42, the motor terminal 8 comes into contact with the conductive portion in a predetermined position, so that the motor (not illustrated) and the female terminal 6 are conductively connected. The intermediate portion 43 is integrated with a rear peripheral wall of the first tubular portion 41 and a rear peripheral wall of the second tubular portion 42. That is, the female terminal 6 has a substantially rectangular C-shape when viewed in the left-right direction.

The female terminal 6 is conductively connected to the male terminal 2 at the first tubular portion 41 and conductively connected to the motor terminal 8 at the second tubular portion 42. That is, the male terminal 2 and the motor terminal 8 are conductively connected by the female terminal 6. More specifically, the control circuit (not illustrated) connected to the other end relative to the connection portion 12 of the male terminal 2 and the motor (not illustrated) including the motor terminal 8 are conductively connected by the electrical junction box 1 (that is, the female terminal 6).

The first housing 4 (including the male terminal 2), the second housing 5 and the female terminal 6 that constitute the electrical junction box 1 are described above.

To assemble the electrical junction box 1 including the first housing 4 integrally molded with the male terminal 2, the second housing 5, and the female terminal 6, it is necessary to assemble the first housing 4 and the second housing 5 after the female terminal 6 is accommodated in the second housing 5.

First, the female terminal 6 is accommodated in the second space 34 of the second housing 5 (see FIG. 2). Then, the first housing 4 is disposed above the second housing 5, and the first housing 4 and the second housing 5 are moved to approach each other along the up-down direction. When the first housing 4 and the second housing 5 are moved to approach each other along the up-down direction, the first tubular portion 41 of the female terminal 6 enters the first space 25 of the first housing 4.

When the first housing 4 and the second housing 5 continue moving to approach each other, an upper end portion of the locked portion 32 of the second housing 5 comes into contact with the locking projection 23 of the first housing 4. When the above movement is further continued, the locked portion 32 is deformed away from the second housing 5, and slips to ride on the locking projection 23. At this time, the connection portion 12 of the male terminal 2 accommodated in the first space 25 of the first housing 4 enters the tubular hole of the first tubular portion 41 of the female terminal 6.

Thereafter, when the above movement is further continued, the locked portion 32 climbs over the locking projection 23 and is restored from the deformation, so that the locking projection 23 is locked in the locking hole 33. At this time, the connection portion 12 of the male terminal 2 is inserted to a predetermined position in the tubular hole of the first tubular portion 41, and comes into contact with the conductive portion (not illustrated) in the tubular hole of the first tubular portion 41, so that the male terminal 2 and the female terminal 6 are conductively connected. Accordingly, the assembly (that is, engagement) of the first housing 4 and the second housing 5 is completed (see FIG. 1).

When the electrical junction box 1 and the motor (not illustrated) are connected, the motor terminal 8 is inserted through the insertion hole (not illustrated) provided in the lower surface of the second housing 5, and is inserted to a predetermined position in the tubular hole of the second tubular portion 42 in the female terminal 6. Accordingly, the motor terminal 8 comes into contact with the conductive portion (not illustrated) in the tubular hole of the second tubular portion 42, so that the female terminal 6 and the motor terminal 8 are conductively connected. That is, the electrical junction box 1 is conductively connected to the motor.

Since the end portion of the male terminal 2 opposite to the connection portion 12 is connected to the control circuit (not illustrated), the control circuit and the motor are conductively connected by the electrical junction box 1 with the above configuration. Specifically, the male terminal 2 is conductively connected to the motor terminal 8 by the female terminal 6. In this way, the control circuit and the motor are conductively connected.

In the electrical junction box 1 according to the first embodiment, in the process of engaging the first housing 4 with the second housing 5, the male terminal 2 is inserted into the female terminal 6 so that the male terminal 2 and the female terminal 6 are conductively connected.

Specifically, the direction in which the male terminal 2 is inserted into the female terminal 6 is the same as the direction in which the first housing 4 is engaged with the second housing 5, and thus the male terminal 2 is inserted into the female terminal 6 by moving the first housing 4 and the second housing 5 to approach each other. For this reason, the electrical junction box 1 according to the first embodiment is excellent in workability of connecting the male terminal 2 and the female terminal 6 and manufacturing the electrical junction box 1.

As another effect, since the male terminal 2 and the female terminal 6 are conductively connected by engaging the first housing 4 with the second housing 5, no dedicated facility for joining (connecting) the male terminal 2 and the female terminal 6 is necessary, and the manufacturing cost is reduced as compared with an electrical junction box in the related art.

The above is the description of the electrical junction box according to the first embodiment of the present disclosure.

Second Embodiment

An electrical junction box according to the second embodiment is different from the electrical junction box 1 according to the first embodiment in a male terminal 102 and a female terminal 106. Otherwise, the electrical junction box according to the second embodiment is the same as the electrical junction box 1 according to the first embodiment. Hereinafter, the difference will be described.

The male terminal 102 is implemented by a flat plate-shaped bus bar. One end of the male terminal 102 is conductively connected to the female terminal 106, and the other end of the male terminal 102 is conductively connected to a control circuit (not illustrated). The male terminal 102 is molded integrally with a first housing similarly to the male terminal 2 of the first embodiment. As illustrated in FIGS. 4A, 4B, 5A, and 5B, the male terminal 102 includes a connection portion 112 that comes into contact with a conductive portion 146 of the female terminal, a pair of protruding portions 113 provided on respective two side edge portions of the connection portion 112, extending portions 114 extending downward from the respective protruding portions 113, and locking projections 115 provided on the respective extending portions 114 and protruding away from the connection portion 112.

The protruding portions 113 are provided on the respective two side edge portions of the connection portion 112 at a predetermined distance upward from a lower end of the connection portion 112, and respectively protrude to the right at the right side edge portion and protrude to the left at the left side edge portion. When the connection portion 112 is inserted into a first tubular portion 141 of the female terminal 106 further than a predetermined position, the protruding portions 113 abut against an upper opening end of the first tubular portion. That is, the protruding portions 113 have a function of preventing the connection portion 112 from being excessively inserted into the first tubular portion 141.

The extending portions 114 extend away from the connection portion 112 in the left-right direction and are substantially parallel to the connection portion 112. The locking projections 115 are provided at lower end portions of the respective extending portions 114. The locking projections 115 have a function of preventing the male terminal 102 and the female terminal 106 from being separated from each other in the up-down direction by being locked to respective locking holes 144 of the first tubular portion 141 of the female terminal 106 to be described later.

The female terminal 106 is made of a conductive material and is thinner than the male terminal 102. As illustrated in FIGS. 4A, 4B, 5A, and 5B, the female terminal 106 includes the first tubular portion 141 into which the male terminal 102 is inserted, a second tubular portion 142 into which a motor terminal is inserted, and an intermediate portion 143 located between the first tubular portion 141 and the second tubular portion 142.

The first tubular portion 141 has a substantially rectangular tubular shape provided with a tubular hole penetrating the first tubular portion 141 in the up-down direction. A lance 145 and a conductive portion 146 are provided in the tubular hole of the first tubular portion 141 (see FIG. 5B). When the connection portion 112 of the male terminal 102 is inserted into the first tubular portion 141, the connection portion 112 comes into contact with the conductive portion 146 in a predetermined position, so that the male terminal 102 and the female terminal 106 are conductively connected.

The locking holes 144 penetrating the first tubular portion 141 in the left-right direction are provided in a right peripheral wall and a left peripheral wall of the first tubular portion 141, respectively. The locking holes 144 have a function of preventing the male terminal 102 and the female terminal 106 from being separated from each other in the up-down direction by locking the locking projections 115 of the male terminal 102.

The second tubular portion 142 and the intermediate portion 143 are similar to the second tubular portion 42 and the intermediate portion 43 of the first embodiment, respectively.

A connection mode of the male terminal 102 and the female terminal 106 of the electrical junction box according to the second embodiment will be described. Also in the electrical junction box according to the second embodiment, when the first housing is engaged with a second housing, the male terminal 102 is inserted into the female terminal 106 so that the male terminal 102 and the female terminal 106 are conductively connected (see FIGS. 4B, 5A, and 5B).

When the first housing and the second housing are moved to approach each other, the male terminal 102 enters a tubular hole of the female terminal 106. At this time, the pair of extending portions 114 are pressed by respective inner walls of the tubular hole of the first tubular portion 141, and are deformed to approach the connection portion 112. The pair of extending portions 114 are deformed until the locking projections 115 of the male terminal 102 reach the locking holes 144 provided in the first tubular portion 141.

Figure 5A:
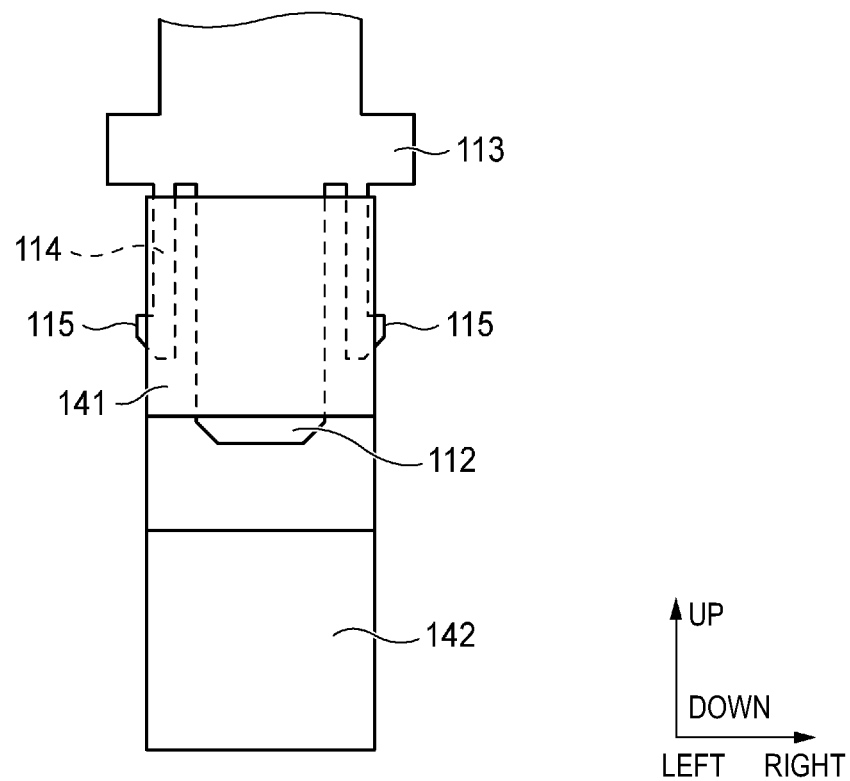
FIG. 5A is a front view of FIG. 4B as viewed from the front.
Figure 5B:
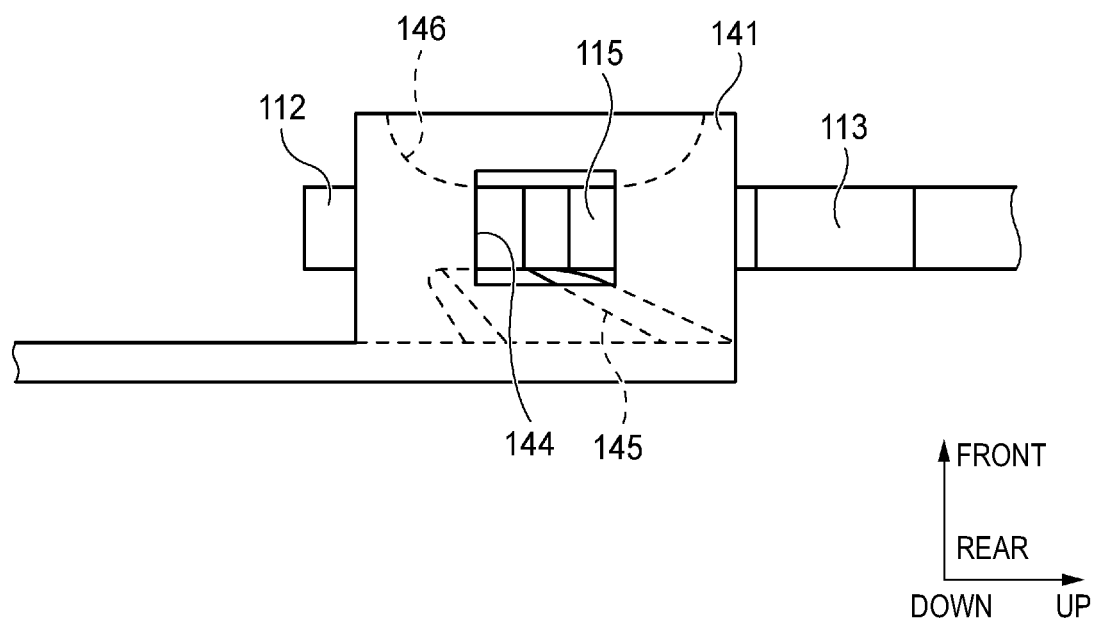
FIG. 5B is a front view of FIG. 4B as viewed from the right (or left)

When the first housing and the second housing continue moving to approach each other and the locking projections 115 reach the locking holes 144, the extending portions 114 are restored from the deformation and the locking projections 115 are locked to the locking holes 144 (particularly, see FIG. 5B). At this time, the connection portion 112 is pressed from the lance 145 toward the conductive portion 146 (see FIG. 5B).

In the electrical junction box according to the second embodiment, since the locking projections 115 of the male terminal 102 are locked to the locking holes 144 of the female terminal 106, the male terminal 102 is prevented from coming off from the female terminal 106. Accordingly, in the electrical junction box according to the second embodiment, the male terminal 102 and the female terminal 106 are maintained in a stable conductive state.

Further, in the electrical junction box according to the second embodiment, similarly to the electrical junction box according to the first embodiment, in the process of engaging the first housing with the second housing, the male terminal 102 is inserted into the female terminal 106 so that the male terminal 102 and the female terminal 106 are conductively connected.

Specifically, the direction in which the male terminal 102 is inserted into the female terminal 106 is the same as the direction in which the first housing is engaged with the second housing, and thus the male terminal 102 is inserted into the female terminal 106 by moving the first housing and the second housing to approach each other. For this reason, the electrical junction box according to the second embodiment is excellent in workability of connecting the male terminal 102 and the female terminal 106 and manufacturing the electrical junction box.

The above is the description of the electrical junction box according to the second embodiment of the present disclosure.

<Operation and Effect>

In the electrical junction box 1 according to the first embodiment and the electrical junction box according to the second embodiment, in the process of engaging the first housing 4 with the second housing 5, the male terminal 2 is inserted into the female terminal 6, so that the male terminal 2 and the female terminal 6 are conductively connected.

Specifically, since the direction in which the male terminal 2 is inserted into the female terminal 6 is the same as the direction in which the first housing 4 is engaged with the second housing 5, the male terminal 2 is inserted into the female terminal 6 by moving the first housing 4 and the second housing 5 to approach each other. For this reason, the electrical junction box 1 according to the first embodiment is excellent in workability of connecting the male terminal 2 and the female terminal 6 and manufacturing the electrical junction box 1.

Other Embodiments

The present disclosure is not limited to the above-described embodiments, and modifications, improvements, and the like can be made as appropriate. Additionally, materials, shapes, sizes, numbers, arrangement positions, and the like of elements in the above-described embodiments are freely selected and are not limited as long as the present invention can be implemented.

Figure 6:
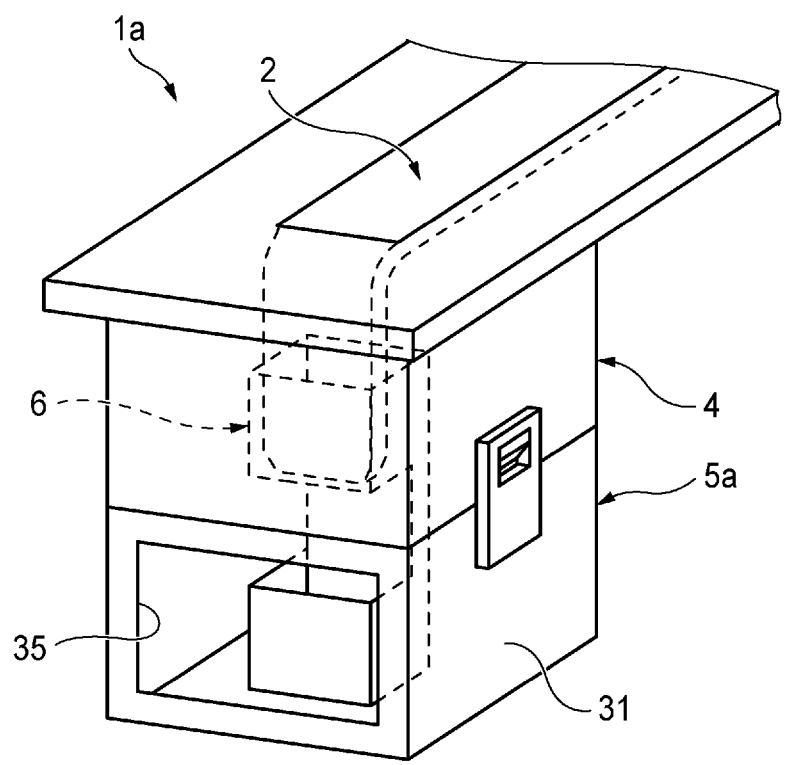
FIG. 6 is a perspective view illustrating an electrical junction box according to another embodiment.
Figure 6:
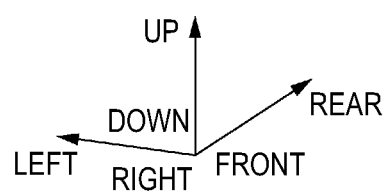

As illustrated in FIG. 6, in a second housing 5a, an opening 35 that exposes the female terminal 6 to the outside may be provided in the main body 31. Accordingly, in an electrical junction box 1a according to another embodiment, even when heat is generated by energization of the male terminal 2 and the female terminal 6, heat accumulation in a space defined by the first space 25 and the second space 34 is prevented by the opening 35.

Here, features of the embodiments of the electrical junction box according to the present disclosure described above will be briefly summarized and listed in the following configurations [1] to [4].

[1] An electrical junction box (1) including: a first housing (4) configured to hold a first terminal (male terminal 2) having a flat plate shape; a second terminal (female terminal 6) configured to allow the first terminal (male terminal 2) to be inserted thereinto such that the second terminal (female terminal 6) is conductively connected to the first terminal (male terminal 2) when the first terminal (male terminal 2) is inserted into the second terminal (female terminal 6); and a second housing (5) configured to be engaged with the first housing (4),
    wherein the first housing (4) has a first space (25) defining, together with a second space (34) of the second housing (5), a space configured to accommodate the second terminal (female terminal 6),
    wherein the first space (25) is configured to accommodate a part of the first terminal (male terminal 2), and
    wherein when the first housing (4) is engaged with the second housing (5), the first terminal (male terminal 2) is allowed to be inserted into the second terminal (female terminal 6) such that the first terminal (male terminal 2) and the second terminal (female terminal 6) are conductively connected.

[2] The electrical junction box (1) according to [1],
    wherein the second terminal (female terminal 6) includes a tubular portion (first tubular portion 41, second tubular portion 42) defining a tubular hole penetrating the tubular portion in an insertion direction in which the first terminal (male terminal 2) is inserted, and
    wherein the insertion direction is the same as a direction in which the first housing (4) is engaged with the second housing (5).

[3] The electrical junction box (1) according to [2],
    wherein the tubular portion (first tubular portion 141) has a locking hole (144) formed in at least a part of a peripheral wall of the tubular portion, the locking hole penetrating the peripheral wall in a direction intersecting the insertion direction, and
    wherein the first terminal (male terminal 102) includes a locking projection (115) configured to be locked to the locking hole (144).

[4] The electrical junction box (1) according to any one of [1] to [3],
    wherein the second housing (5a) has an opening (35) configured to expose the second terminal (female terminal 6) to an outside of the second housing (5a).

The electrical junction box having the configuration [1] will be described below. The electrical junction box having this configuration includes a first housing configured to hold a first terminal having a flat plate shape, a second terminal configured to allow the first terminal to be inserted such that the second terminal is conductively connected to the first terminal when the first terminal is inserted into the second terminal, and a second housing configured to be engaged with the first housing. The first housing has a first space defining, together with a second space of the second housing, a space configured to accommodate the second terminal. The first space is configured to accommodate a part of the first terminal. That is, when the second space of the second housing accommodates a part of the second terminal and the first housing holding the first terminal is engaged with the second housing, the first terminal and the second terminal are conductively connected. In this way, the first terminal and the second terminal are allowed to be conductively connected by engaging the first housing with the second housing, and thus the electrical junction box having the configuration is excellent in workability of connecting (joining) the first terminal and the second terminal and manufacturing the electrical junction box.

As another effect, since the first terminal and the second terminal are allowed to be conductively connected by engaging the first housing with the second housing, no facility for connecting the first terminal and the second terminal is necessary, and the manufacturing cost is reduced as compared with an electrical junction box in the related art.

The electrical junction box having the configuration [2] will be described below. The second terminal includes a tubular portion defining a tubular hole penetrating the tubular portion in an insertion direction in which the first terminal is inserted. The insertion direction in which the first terminal is inserted into the second terminal is the same as a direction in which the first housing is engaged with the second housing. Accordingly, the first terminal is inserted into the second terminal (that is, the first terminal and the second terminal are conductively connected) by moving the first housing to be engaged with the second housing. In this way, the electrical junction box having the configuration is excellent in workability of connecting the first terminal and the second terminal and manufacturing the electrical junction box.

The electrical junction box having the configuration [3] will be described below. The tubular portion is provided with a locking hole formed in at least a part of a peripheral wall, and the locking hole penetrates the peripheral wall in a direction intersecting the insertion direction. The first terminal includes a locking piece projection configured to be locked to the locking hole. Accordingly, in the electrical junction box having the configuration, the first terminal is prevented from falling off from the second terminal, and thus a stable conductive state of the first terminal and the second terminal is maintained.

The electrical junction box having the configuration [4] will be described below. The second housing is provided with an opening configured to expose the second terminal to an outside of the second housing. Accordingly, in the electrical junction box having the configuration, even when heat is generated by energization of the first terminal and the second terminal, the heat is prevented from being retained in the space defined by the first space and the second space.

What is claimed is:

1. An electrical junction box comprising:
a first housing configured to hold a first terminal having a flat plate shape;
a second terminal configured to allow the first terminal to be inserted thereinto such that the second terminal is conductively connected to the first terminal when the first terminal is inserted into the second terminal; and a second housing configured to be engaged with the first housing, wherein a first space provided inside of the first housing defines, together with a second space provided inside of the second housing, a space configured to accommodate the second terminal, wherein the first space is configured to accommodate a part of the first terminal, wherein when the first housing is engaged with the second housing, the first terminal is allowed to be inserted into the second terminal such that the first terminal and the second terminal are conductively connected, wherein the second terminal comprises a tubular portion defining a tubular hole penetrating the tubular portion in an insertion direction in which the first terminal is inserted, wherein the insertion direction is the same as a direction in which the first housing is engaged with the second housing, wherein the tubular portion has a locking hole formed in at least a part of a peripheral wall of the tubular portion, the locking hole penetrating the peripheral wall in a direction intersecting the insertion direction, wherein the first terminal comprises a locking projection configured to be locked to the locking hole, wherein the first terminal further comprises a protruding portion configured to restrict an amount of insertion into the second terminal, and an extending portion extending from the protruding portion in the insertion direction, and wherein the locking projection is provided on an end of the extending portion.

2. The electrical junction box according to claim 1, wherein the second housing has an opening configured to expose the second terminal to an outside of the second housing.

* * * * *